Oct. 20, 1959  R. O. HELGEBY  2,909,365
SPEEDOMETER APPARATUS
Filed Sept. 14, 1954  2 Sheets-Sheet 1
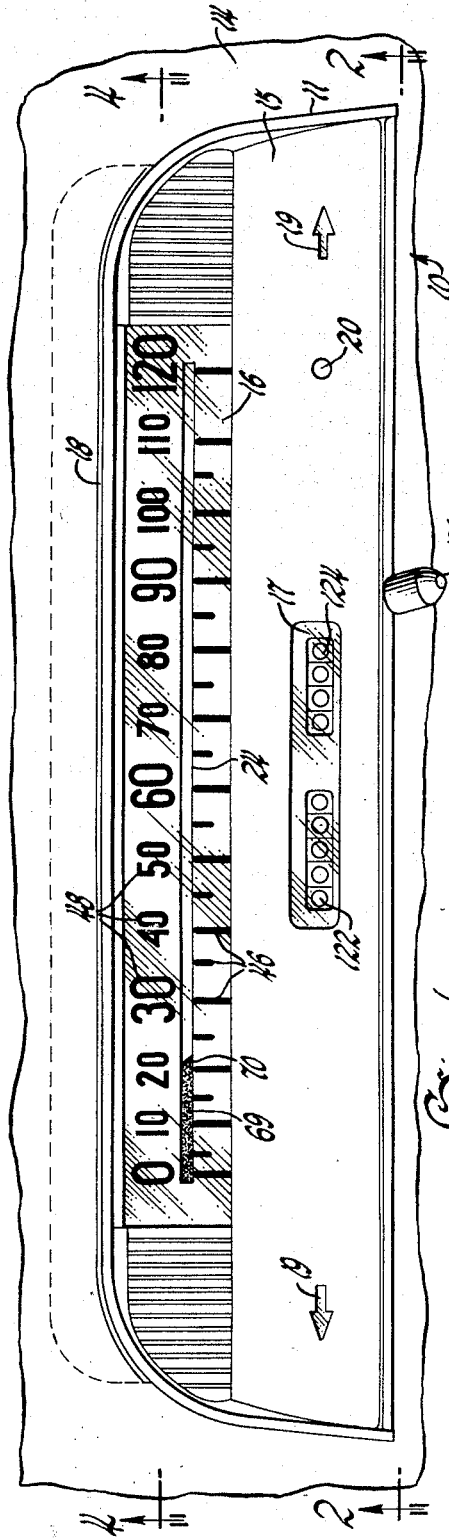
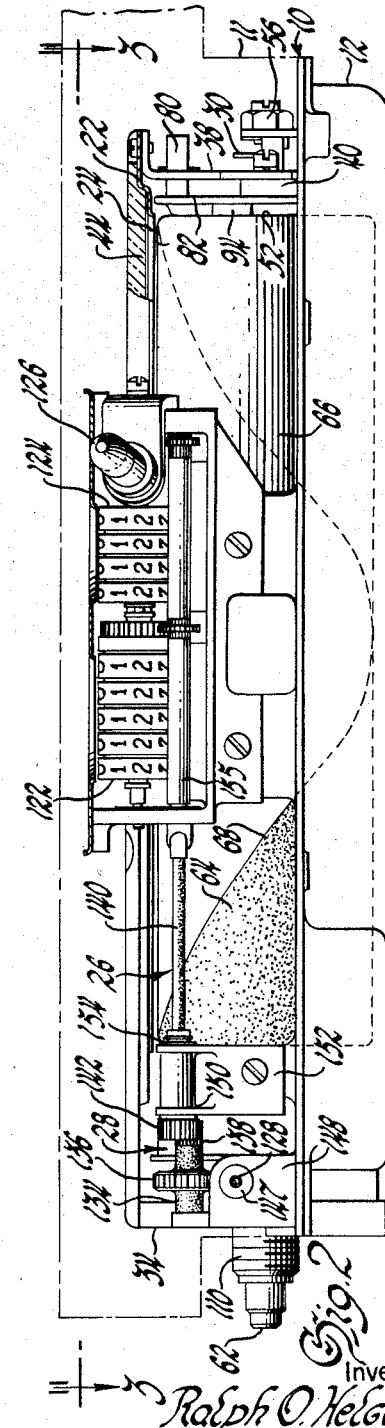
Inventor
Ralph O. Helgeby
By L. D. Burch
Attorney Oct. 20, 1959  R. O. HELGEBY  2,909,365
SPEEDOMETER APPARATUS
Filed Sept. 14, 1954  2 Sheets-Sheet 2

Inventor
Ralph O. Helgeby
By L. D. Burch
Attorney

2,909,365

SPEEDOMETER APPARATUS

Ralph O. Helgeby, Flint, Mich., assignor to General Motors Corporation, Detroit, Mich., a corporation of Delaware Application September 14, 1954, Serial No. 455,906

1 Claim. (Cl. 264—13)

This invention relates generally to indicating apparatus for speedometers and the like and seeks generally to effect improvements in apparatus of this and a related character.

The invention is shown in an in-line drum type speedometer in which the indicator drum is rotatable on an axis that is parallel to an elongated opening formed in a face plate, casing or the like that is spaced from the drum. The surface of the drum has a spiral line thereon, a portion of which is presented in the opening and serves as a continuous and movable indicator pointing to indicia along the walls of the opening to indicate the vehicle speed of travel. The drum is provided with a magnetic drive connection, which is adapted to supply a continuous turning moment to rotate the drum relative to the panel or casing in accordance with the speed to be indicated, and with counter-torque producing means displaced by rotation of the drum for developing an opposing turning moment and stopping the drum.

In accordance with one aspect of the present invention, the invention has for an object to provide an improved form of magnetic drive connection which contributes materially to the design of a compact in-line drum type speedometer of minimum overall dimensions, which provides the increased driving torque required by drum type indicator apparatus of this character, and which simplifies the manner of supporting the drum and its attachment to the drive connection.

In accordance with another aspect of the present invention, the invention has for another object to provide an improved form of indicator drum construction which is adapted for and facilitates rapid and accurate balance corrections to be made thereon for any unbalance condition of the drum.

In accordance with still another aspect of the present invention, the invention has for another object to provide an improved form of combined in-line speedometer and odometer apparatus in which the odometer is never obstructed by any portion of the speedometer indicator apparatus and which features an improved form of odometer drive connection that facilitates rapid assembly and assures proper alignment and continued operation of the parts thereof.

The above and other objects together with the features and advantages attending the present invention will appear more fully from the following detailed description and drawings wherein:

Fig. 1 is a front elevation view of an in-line speedometer indicator which includes the features of the present invention;

Fig. 2 is a bottom plan view with the front cover removed taken in the direction 2—2 of Fig. 1;

Figure 5:
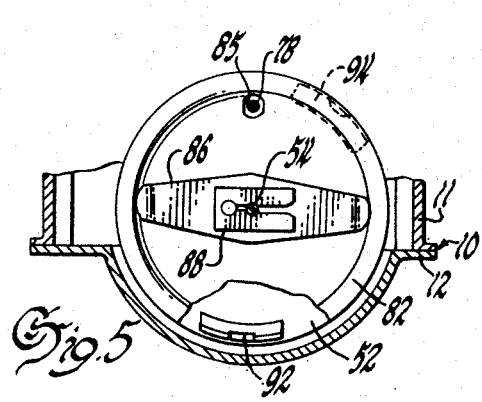
Fig. 5 is a fragmentary end view taken in the direction 5—5 of Fig. 4.

Referring to the drawings, the in-line speedometer and odometer indicator apparatus illustrated comprises a die cast two-piece casing 10 having a front cover or casing portion 11 and a rear casing portion 12 which are adapted to be detachably secured together along their abutting edges or flanges shown in Fig. 5, as by screws 13 and to be installed as a unit in a generally rectangular opening provided in the dash panel 14 of the vehicle. The front cover or casing 11 has a generally rectangular face portion 15 which includes a pair of elongated rectangular openings 16 and 17 therein having transparent curved glass or plastic inserts covering the openings and suitably affixed to the inner surface of the face of the cover. The large upper opening 16 extends longitudinally substantially the length of the cover and provides a viewing window for the speedometer indicator, while the smaller symmetrically located lower opening 17 provides a viewing window for the vehicle and trip odometer, the mechanism of which, like that of the speedometer indicator, is mounted on the rear casing portion 12. An integrally formed forwardly extending visor 18 substantially surrounding the openings is provided on the face of the front cover portion to prevent glare and avoid viewing discomfort. Suitable openings for direction signal pilot indicators 19 and a high beam vehicle headlamp pilot indicator 20 also are provided in the face of the front cover, as shown.

The speedometer mechanism is supported from the rear casing portion and includes a stamped channeled plate or panel member 22 having a narrow elongated slot 24 therein, an indicator drum 26, a magnetic drive connection 28 and counter-torque producing means in the form of a coiled hairspring 30. The channeled panel member 22 is spaced from the surface of the drum and is supported at one end from a forwardly extending leg or end wall 34 integrally formed on the rear cover portion 12 and at its other end from a bracket 38 detachably fixed to a pair of laterally spaced stub legs as 40, only one of which is shown in Fig. 2 and which are integrally formed on the rear casing portion. Seated between the flanges of the channeled plate member 22 is a transparent plastic plate 44 having opaque graduations 46, which terminate at a point coinciding with the lower edge of the slot 24 in the channeled member, and numerical speed indicia 48, which are distributed along the upper edge of the slot. The graduations 46 are preferably non-linearly spaced with the wider increments at the higher speeds of travel for ease of reading at high vehicle speeds.

The indicator drum 26 is a light thin-wall elongated cylinder, preferably of drawn aluminum or other light material construction, which is shown open at one end, and is rigidly fixed at its closed other end 52 to a brass shaft 54 that is pivotally supported in a bearing 56 (Fig. 4) contained in an integrally formed offset portion 58 of the support bracket 38, substantially as shown. The other end of the drum shaft is rigidly fixed to a rotatable portion of the magnetic speedometer drive unit, shortly to be described, and is pivotally supported in a jeweled bearing 60 contained in the main drive shaft 62 of the speedometer and odometer mechanism. The outer surface of the indicator drum is divided into a pair of spiral zones or segments 64, 66 by a spiral line 68 extending both longitudinally the length of the drum and, preferably, one complete turn or 360 degrees around the circumference thereof.

The segments 64, 66 are painted, preferably, in vivid contrasting colors, say black and vermillion red as by a silk-screen process, with the spiral line 68 forming a separatrix at the junction or adjacent edges of the segments, whereby there will be presented in the slot 24 a movable horizontal band or column 69 (Fig. 1) of one of said contrasting colors constituting a continuous index, the length of which measured from one end of the slot will yield a space indication of the approximate speed of vehicle travel. The end of the movable index 69 is formed by the portion of the spiral line that is intercepted between the upper and lower walls of the slot 24 and will be presented as a short but well defined inclined line 70, which serves as a pointer pointing to the graduations 46 adjacent the lower edge or wall of the slot to indicate the exact speed of vehicle travel.

In order to provide an opposing turning moment to the driving torque applied through the magnetic drive unit and thus prevent rotation of the drum so that the movable band or index will remain stationary at any particular vehicle speed, there is provided near the right hand end of the drum shaft 54 the coiled spiral hairspring 30, the outer end of which is fixed to a centrally offset crosspiece 76 (Fig. 4), attached to the stationary bracket 38 and the inner end of which is rigidly fixed to the rotatable drum shaft. The spring thus develops a counter-torque proportional to the rotational displacement of the drum by the applied driving torque from the magnetic drive connection and serves, at equilibrium, to stop continued rotational movement of the drum, allowing the drum to be rotatably displaced an amount corresponding to the vehicle speed of travel.

Figure 4:
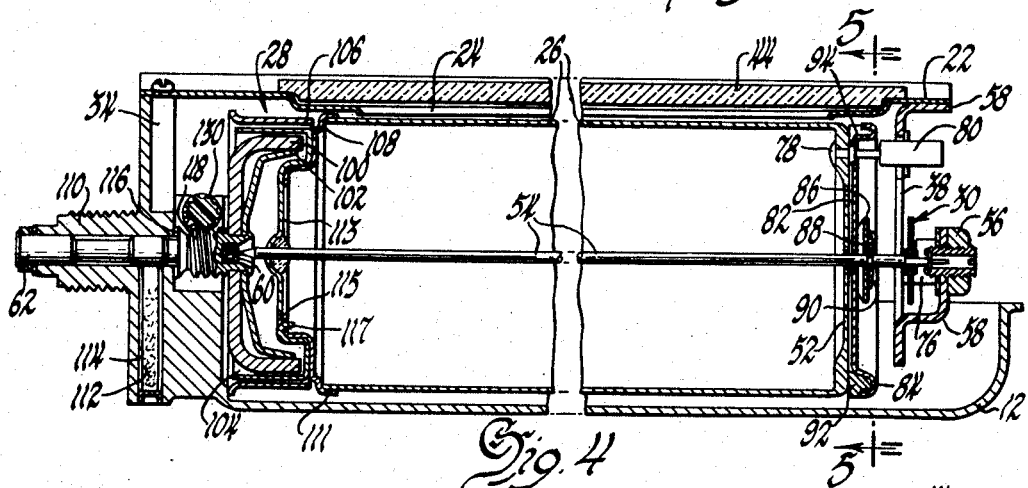
Fig. 4 is a broken and sectional view taken in the direction 4—4 of Fig. 1.

To prevent movement of the drum through more than approximately one complete turn thereof, the end 52 of the drum has a pin 78 secured thereto. The end of the pin extends beyond the end of the drum and is adapted to contact a stop 80 fastened to the bracket 38, as shown in Fig. 4.

Since there will be some variation in the thickness of the wall of the cylindrical drum by reason of the manner in which it is formed, the drum will be unbalanced, and in accordance with one important aspect of the present invention, novel means are provided to facilitate rapid balancing thereof during assembly of the speedometer apparatus. As shown in Figs. 2, 4 and 5, the drum is provided with a separate end plate 82, which is located adjacent the end 52 thereof and has an integrally formed U-shaped circumferential rim or flange 84 around the outer periphery thereof. The plate 82 is centrally apertured to be received freely on the drum shaft 54 and has another opening 85 near the outer periphery thereof for the stop pin 78. The plate 82 is retained on the shaft and urged against the adjacent face of the end of the drum by a bowed spring 86 and a slotted clip member 88, which bears against the lands or shoulders of a reduced portion provided by an annular groove 90 on the drum shaft.

The auxiliary plate and spring clip assembly above described adapt the drum to facilitate balance corrections to be made thereto. The condition of balance of the drum may be determined by static balance determining apparatus in the nature of that described in U.S. Patent 2,079,902, issued May 11, 1937, in the name of R. De Witt, and any unbalance found therein may be corrected by insertion of a pair of arcuately shaped lead weights 92, 94, which are received in the U-shaped flange 84 of the plate 82. The balancing weights are inserted in position by forcing the plate 82 away from the end of the drum, thus compressing the spring 86 which retains the weights against the end of the drum, as shown in Fig. 4. The balancing weights may be angularly positioned by the balancing operator to provide a wide range of balance corrections that may be required for the drum.

In accordance with another important aspect of the present invention, there is provided a novel form of magnetic drive unit which is uniquely and closely associated with the indicator drum. The drive unit includes the shaft 62, a U-shaped permanent magnet 100 and a temperature compensator 102, a rotatable speed cup 104, and a novel two-piece ferro-magnetic field plate assembly which includes a stationary cylindrical frame member 106 and a rotatable field plate 108.

The drive shaft 62 receives the end of a speedometer cable (not shown) in the outer end thereof and is rotatably supported in a bearing journal 110 integrally formed in the end wall 34 of the rear cover portion. An oil wick 112 is provided in a capped opening 114 in the end wall for lubrication of the shaft, as shown in Fig. 4. A thrust washer 116 bearing against the inner surface of the end wall 34 is provided near the right-hand end of the drive shaft, which further includes an enlarged, integrally formed, threaded or toothed worm portion 118 from which the odometer mechanism is driven. The extreme right end of the drive shaft 62 receives the magnet 100 and temperature compensating element 102 and is upset to retain these elements thereon.

Spaced from and surrounding the salient poles of the U-shaped drive magnet 100 which is preferably of high cobalt content, is the cylindrical speed cup 104 shown as having an off-set central portion. The speed cup is composed of non-magnetic electrically conducting material, such as aluminum having its surface copper plated, and is soldered or otherwise rigidly attached to the drum shaft 54, as shown. Spaced from and surrounding the cylindrical outer surface of the speed cup is the stationary cylindrical magnetic frame member 106, which is riveted or otherwise secured to the end wall 34 of the rear cover portion 12. The rotatable field plate 108 of the present invention is shown in contiguous or abutting contact relation with and forming a backing plate for the speed cup and has a peripheral flange or rim 111 thereon which receives the open end of the indicator drum and serves as a cover and support therefor. The rotatable field plate is provided with a large centrally located opening 113 thereon having a notch 115 in the inner edge thereof to receive a positive drive tang 117 integrally formed in the speed cup 104, as shown in Fig. 4.

Figure 6:
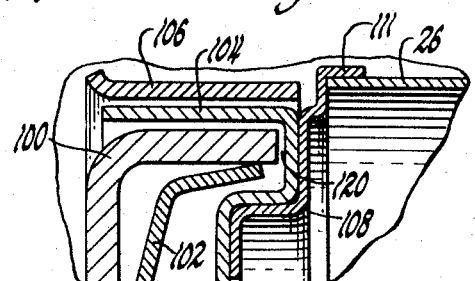
Fig. 6 is a fragmentary enlarged sectional view of a part of Fig. 4.

The main magnetic circuit of the magnetic or eddy-current drive connection extends from one of the tips or pole faces of the magnet 100 through the air gap 120 of Fig. 6 between the pole and the speed cup, through the eddy-current torque producing speed cup, the adjacent magnetic rotatable field-plate 108 and then back through the speed cup and air gap to the opposite pole of the magnet. Since there is but a single air gap between the magnet and the rotatable field plate in the above-described magnetic circuit, it is apparent that the magnetomotive force available in the form of eddy-current magnetic drive connection of the present invention will be greater than that produced in conventional forms of magnetic drive connections in which the field plate is spaced from the speed cup by an additional air gap in order to allow relative movement between the speed cup and the field plate. In other words, by providing a field plate assembly having a portion 108 contiguous to and rotatable with the speed cup, the magnetic-flux produced by the magnet can be made to flow mainly through a magnetic circuit having but one air gap therein, and thus substantially increase the torque output of the magnetic drive connection.

Since the field plate 108 is also a structural part of the indicator drum, additional bearings, which would otherwise be required were the drive unit not intimately associated with the indicator as in other forms of magnetic drive connections, are eliminated, thus greatly simplifying the construction of the assembly and its manner of attachment to the drive connection as well as reducing the overall length and dimensions of the entire assembly. Conceivably, the field plate 108 could be offset in the opposite direction shown so as to extend inwardly of the drum, and the magnet 100 and stationary field frame member 106 telescoped into the interior of the drum so as to further decrease the overall dimensions of the assembly.

Figure 3:
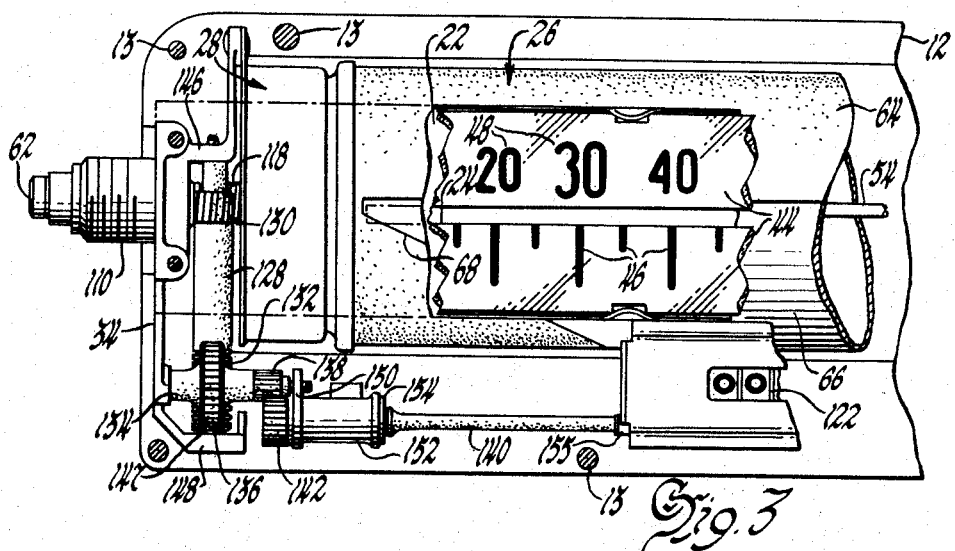
Fig. 3 is a fragmentary front elevational view with parts broken away and with the front cover removed of the apparatus of Fig. 1 and taken in the direction 3—3 of Fig. 2.

The odometer unit assembly includes a standard vehicle odometer 122 and trip odometer 124, the latter being manually resettable by the stem 126 and an associated clutch arrangement, not shown. The odometers are designed along conventional lines and reference may be made to prior art such as United States Patent 2,073,153, issued March 9, 1937, in the name of the present inventor for details as to the construction of the odometers per se. The odometers are driven from a drive assembly which includes the worm 118 formed on drive shaft 62, a vertical shaft 128 having a gear 130 near its upper end meshing with worm 118 and a worm 132 at its lower end, a horizontal stub shaft 134 having an integrally formed cog wheel or gear 136 intermediate its ends and a smaller pinion gear 138 at its right-hand end, and a counter shaft 140 having a driven gear 142 at one end driven from gear 138, as shown in Fig. 3.

The vertical shaft 128 is normal to and located slightly off the center line of the drum, as shown in Fig. 4, and is rotatably supported at its upper end from an offset portion 146 of the end wall 34 and at its lower end in a bushing 147 in another offset portion 148 spaced from 146. Horizontal stub shaft 134 is parallel to the axially aligned drum and drive shafts and is supported at one end in a bushing in end wall 34 of the rear casing and at its other end in an arm 150 of a bracket 152 attached to the rear cover, as shown in Figs. 2 and 3. The bracket 152 also includes a sleeve portion which supports the parallel counter shaft 140 at its gear end. A flexible washer 154, which is received on a groove on shaft 140 adjacent the right hand end of bracket 152, is provided to retain the shaft 140 in the sleeve bracket. The portion of the shaft 140 beyond the bracket is of reduced diameter and has its extreme right end squared and received in the squared end of a coaxially aligned tubular shaft 155, which drives the odometer wheels of the respective in-line vehicle and trip odometers, the axes of which are parallel to the speedometer drive and drum axes.

The particular design and disposition of speedometer and odometer indicators and the drives therefor thus assures that these indicators will always be in full view of the driver of the vehicle and that no part of the vehicle or trip odometers will ever be obscured by the speedometer, as is often the case with conventional needle-pointer type speedometer apparatus. In accordance with another feature of the invention, the parts 128, 134, 140 and 154 are of molded plastic, preferably, nylon construction, which, in addition to providing smooth and silent operation, eliminates the need for periodic oiling and greasing by reason of its self-lubricating quality and has proven to provide long service life with no significant wear after the equivalent of hundreds of thousands of miles of test operation. Of even greater and unobvious significance, however, is the fact that the nylon construction of the above parts compensates for any slight warpage, shrinkage, expansion or misalignment of parts so as to be self-aligning and aid in fitting of parts by reason of their inherent flexibility and elasticity.

While the features of the present invention have been shown in an in-line drum type speedometer indicator, the various aspects thereof may have application to other forms of indicators and related apparatus and devices which may employ certain of the parts, including the eddy-current drive connection of the invention claimed herein.

What is claimed is:

An instrument such as a speedometer including aligned drive and driven shafts, a casing rotatably supporting said shafts, an elongated thin-walled indicator drum fixed to said driven shaft for rotation therewith, a magnetic field plate and a non-magnetic speed cup joined together and fixed as a unitary cover to one end of said drum and extending away from the latter, a U-shaped permanent magnet fixed to said drive shaft, a magnetic frame member attached to said casing and surrounding said magnet, a peripheral portion of said speed cup being arranged between said magnet and said frame member and coaxial therewith, and the bottom of said speed cup being interposed between the ends of said magnet and said magnetic field plate.

References Cited in the file of this patent

UNITED STATES PATENTS

| | | |
|---|---|---|
| 209,475 | Harris | Oct. 29, 1878 |
| 643,413 | Kennedy | Feb. 13, 1900 |
| 729,164 | Haskins | May 26, 1903 |
| 1,181,186 | Thompson | May 2, 1916 |
| 1,570,021 | Whittington | Jan. 19, 1926 |
| 1,605,576 | Berge | Nov. 2, 1926 |
| 1,665,278 | Ramsey | Apr. 10, 1928 |
| 1,677,990 | Robbins | July 24, 1928 |
| 1,967,092 | Leibing | July 17, 1934 |
| 2,336,172 | Helgeby | Dec. 7, 1943 |
| 2,648,019 | Rodanet | Aug. 4, 1953 |
| 2,674,447 | Sivacek | Apr. 6, 1954 |
| 2,769,932 | Zozulin et al. | Nov. 6, 1956 |